United States Patent
Yuen (10) Patent No.: US 11,316,686 B2
(45) Date of Patent: Apr. 26, 2022

(54) PROTECTIONS FOR UNAUTHORIZED COPYING (ANTI-CLONING) METHOD AND SYSTEM

(71) Applicant: PERMANENT PRIVACY LTD., Tortola (VG)

(72) Inventor: Pak Kay Yuen, Shatin (CN)

(73) Assignee: PERMANENT PRIVACY LIMITED, Tortola (VG)

( * ) Notice: Subject to any disclaimer, the term of this patent is extended or adjusted under 35 U.S.C. 154(b) by 394 days.

(21) Appl. No.: 16/349,907

(22) PCT Filed: Nov. 18, 2016

(86) PCT No.: PCT/IB2016/056960
§ 371 (c)(1),
(2) Date: May 14, 2019

(87) PCT Pub. No.: WO2018/091946
PCT Pub. Date: May 24, 2018

(65) Prior Publication Data
US 2019/0312721 A1    Oct. 10, 2019

(51) Int. Cl.
*H04L 9/08* (2006.01)
*G11B 20/00* (2006.01)
(Continued)

(52) U.S. Cl.
CPC .......... *H04L 9/0891* (2013.01); *G06F 21/602* (2013.01); *G06F 21/6209* (2013.01);
(Continued)

(58) Field of Classification Search
CPC ..... G06F 21/10–105; G06F 21/60–604; G06F 21/62–6218; G11B 20/00166;
(Continued)

(56) References Cited

U.S. PATENT DOCUMENTS 6,986,044 B1    1/2006  Inada
9,379,890 B1 *  6/2016  Blakely ................. H04L 9/0897
(Continued)

FOREIGN PATENT DOCUMENTS

EP           3 378 188 B1      4/2020
JP           2006-301992       11/2006
WO    PCT/IB2016/056960       11/2016

OTHER PUBLICATIONS

"VeraCrypt User's Guide", version 1.0e. Released by IDRIX on Nov. 30, 2014. (Year: 2014).*
(Continued)

*Primary Examiner* — Kevin Bechtel
(74) *Attorney, Agent, or Firm* — Staas & Halsey LLP (57) ABSTRACT

An object is protected from unauthorized copying by providing a key generator for the object, producing a first key, second key and a lock for the keys, storing the first key in the object, storing the second key in a database separate from the object, reading the first and second keys, opening the lock with the first and second keys, producing a third and fourth keys and a new lock for the object, invalidating the first and second keys, replacing the first key in the object with the third key, and replacing the second key in the database with the fourth key.

15 Claims, 4 Drawing Sheets

(51) Int. Cl.
  *G06F 21/62* (2013.01)
  *G06F 21/60* (2013.01)
(52) U.S. Cl.
  CPC ...... *G11B 20/00166* (2013.01); *H04L 9/0822* (2013.01); *H04L 9/0869* (2013.01); *H04L 2209/60* (2013.01)
(58) Field of Classification Search
  CPC ... H04L 9/0816; H04L 9/0819; H04L 9/0822; H04L 9/085; H04L 9/0861; H04L 9/0869; H04L 9/0891; H04L 2209/60; H04L 2209/605
  See application file for complete search history.

(56) References Cited

U.S. PATENT DOCUMENTS

| | | | | |
|---|---|---|---|---|
| 9,703,965 | B1* | 7/2017 | Robinson | H04L 63/0428 |
| 2008/0006321 | A1 | 3/2008 | Goodman et al. | |
| 2013/0054967 | A1 | 2/2013 | Davoust et al. | |
| 2016/0269106 | A1* | 9/2016 | Adam | G06T 7/0004 |
| 2017/0200149 | A1* | 7/2017 | Antunovic | G06Q 20/3821 |

OTHER PUBLICATIONS

First Notification of Office Action, dated Mar. 31, 2021, in corresponding Chinese Patent Application No. 201680090783.4 (15 pp.).
Office Action, dated May 6, 2020, in corresponding Eurasian Patent Application No. 201991163/31 (4 pp.).
Notification of Readiness to Grant a Patent, dated Sep. 8, 2020, in corresponding Eurasian Patent Application No. 201991163/31 (8 pp.).
Notice of Reasons for Rejection, dated Sep. 1, 2020, in corresponding Japanese Application No. 2019-520847 (7 pp.).
European Office Action dated May 29, 2019 in corresponding European Patent Application No. 16802147.5.
International Preliminary Report on Patentability (PCT Rule 44bis.1(c)) for International Application No. PCT/IB2016/056960 dated May 21, 2019.
Notification of Decision to Grant, dated Jun. 28, 2021, in corresponding African Regional Application No. AP/P/2019/011549 (5 pp.).
Official Communication dated Nov. 14, 2019 in corresponding European application 16 802 147.5-1218, 27 pages.
Certificate of Grant for European Patent No. 3 378 188 (1 pg.).
J. Li et al.; "Rekeying for Encrypted Deduplication Storage"; 2016 46th Annual IEEE/IFIP international Conference on Dependable Systems and Networks (DSN), IEEE, Jun. 28, 2016, XP032973596, retrieved on Sep. 29, 2016; pp. 618-629 (12pp).
International Search Report for PCT/IB2016/056960; dated Jun. 23, 2017.
Written Opinion of the International Search Authority (PCT Rule 43bis.1); for International Application No. PCT/IB2016/056960 dated Jun. 23, 2017.
Office Action, dated Aug. 16, 2021, in corresponding ARIPO Patent Application No. AP/P/2019/011549 (7 pp.).
First Examination Report, dated Nov. 16, 2021, in Indian Patent Application No. 201917013772 (5 pp.).

* cited by examiner

PROTECTIONS FOR UNAUTHORIZED COPYING (ANTI-CLONING) METHOD AND SYSTEM

CROSS REFERENCE TO RELATED APPLICATIONS

This application is the U.S. national stage of International Application No. PCT/IB2016/056960, filed Nov. 18, 2016, which is incorporated by reference herein in its entirety.

BACKGROUND

1. Field

Anti-cloning protections.

2. Description of the Related Art

Security cards may be copied, even if they are encrypted. Such security cards may be passports and identity cards, cash machine cards, or credit cards. Hardware devices such as TV set-top boxes, and software including games, automation software, operating systems, or software applications can also be copied, even if it is encrypted.

It also may be difficult to detect and/or invalidate the existence of an unauthorized copy of, for example, a security card, or the activities in which an unauthorized copy is used, automatically.

SUMMARY

In one aspect, an object is protected from unauthorized copying by providing a lock for the object, producing a first and second keys for the lock or producing one key and then separating the key into first and second keys, storing the first key in the object, storing the second key in a database separate from the object, reading the first and second keys, joining or combining the first and second keys together, opening the lock with the first and second keys, producing a key and splitting it into third and fourth keys, using the third and fourth keys to encrypt account information again to obtain a new encryption result, the new encryption result together with third and fourth key forming a new lock, the new lock effectively invalidating the first and second keys, replacing the first key in the object with the third key; and replacing the second key in the database with the fourth key.

In several aspects, the object is a passport, a bank card, an electronic travel card, a protected electronic document, a smart TV box, a cable TV box, an automobile, an automobile part, a software license, or digital media.

In several aspects, the bank card is a credit card, an ATM card, a debit card, a deposit card, or an electronic payment card.

In several aspects, the electronic travel card is an Oyster card or an Octoplus card.

In several aspects, the software license is a program license, automation software license, an operating system license, or a mobile phone app.

In several aspects, the digital media is a game, music, a movie, a video clip, television, or an online television series.

In a further aspect, the first and second keys are produced by encrypting account information and separating the encrypted account information into the first and second keys, provided each encryption is different.

In a further aspect, the account information is account information of a user of the object.

In another aspect, a system protects an object from unauthorized copying, the system includes a memory and a processor coupled to the memory, the processor is configured to provide a first and second keys or one key separated into a first and second keys, use the first and second keys to encrypt account information to generate a new lock, store the first key in the object, store the second key in a database separate from the object, read the first and second keys, open the lock with the first and second keys, produce a third and fourth keys and generate a new lock, the new lock invalidating the first and second keys, replace the first key in the object with the third key; and replace the second key in the database with the fourth key.

In yet another aspect, an apparatus protects an object from unauthorized copying, the apparatus includes an encryption engine, an object key reader and an issuer key reader coupled to the encryption engine and configured to read an object key and an issuer key respectively, a key validator coupled to the encryption engine and configured to encrypt or decrypt the object key and the issuer key to validate the object key and the issuer key, a key generator coupled to the encryption engine and configured to encrypt or decrypt account information to generate a new and different encryption code and split the encryption code into the object key and the issuer key; and a key updater coupled to the key generator and configured to update the object key and the issuer key by replacing the object key and the issuer key with a new object key and a new issuer key, respectively, and discard the object key and the issuer key.

In yet another aspect, an object is protected from unauthorized copying by providing a key generator for the object, producing a first and second keys and a lock for the first and second keys, storing the first key in the object, storing the second key and a time key in a database separate from the object, reading the first and second keys, joining the first and second keys, opening the lock by a match of decryption on the joined first and second keys using the stored time-key, producing a new time key, a third and fourth keys and a new lock, invalidating the first and second keys with the new lock, replacing the first key in the object with the third key, and replacing both the time key and the second key in the database with the new time key and the fourth key.

In yet another aspect, a system protects an object from unauthorized copying, the system includes a memory and a processor coupled to the memory, the processor is configured to provide a key generator for the object, produce a first and second keys and a lock for the first and second keys, store the first key in the object, store the second key and a time key in a database separate from the object, read the first and second keys, join the first and second keys, open the lock by a match of decryption on the joined first and second keys using the stored time-key, produce a new time key, a third and fourth keys and a new lock, invalidate the first and second keys with the new lock, replace the first key in the object with the third key, and replace both the time key and the second key in the database with the new time key and the fourth key.

In yet another aspect, an apparatus protects an object from unauthorized copying, the apparatus includes an encryption engine, an object key reader and an issuer key reader coupled to the encryption engine and configured to read an object key and an issuer key respectively, a key validator coupled to the encryption engine and configured to encrypt or decrypt the object key and the issuer key to validate the object key and the issuer key, a key generator coupled to the encryption engine and configured to generate a time-key and to encrypt or decrypt the object key and the issuer key to generate an encryption code and split it into the object key and the issuer key, and a key updater coupled to the key generator and configured to update the object key and the issuer key by replacing the object key and the issuer key with a new object key and a new issuer key, respectively, and discard the object key and the issuer key.

The above and other features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
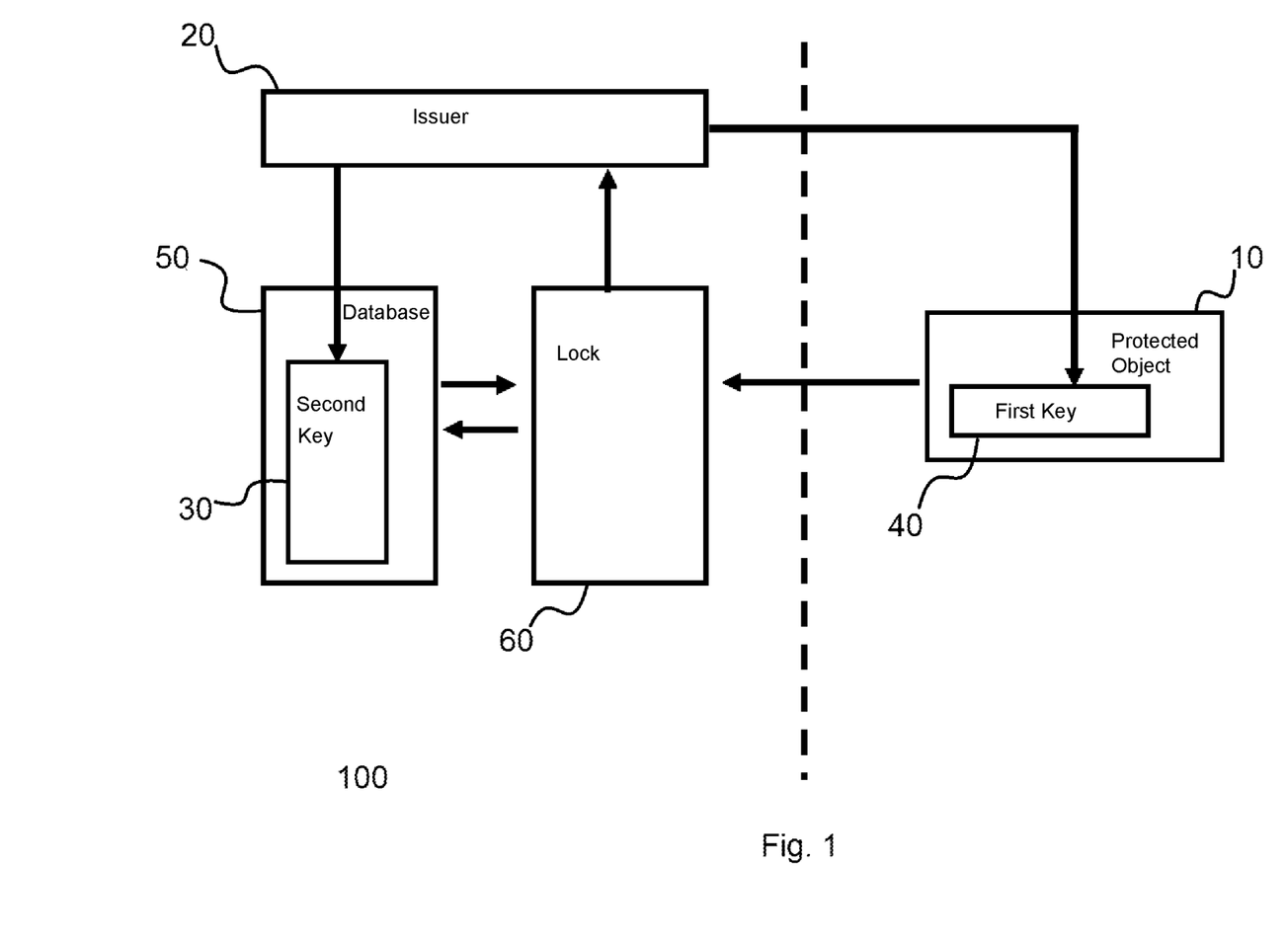
FIG. 1 shows a schematic of a system for protecting an object from unauthorized copying according to an embodiment.

A schematic of a system 100 for protecting an object from unauthorized copying according to an embodiment is shown in FIG. 1.

The invention was inspired by the safe deposit box system used by banks. When we open a safe deposit box at a bank, the bank provides two keys. One key is kept by the customer and the other key known as the "Guard Key" is kept by the bank. Only when two keys operate together, the "lock" of the safe deposit box can be opened.

Question: Would it be safer if the bank provided two new keys and changed the lock every time we visited the safe deposit box?

Answer: It would be neither practical nor useful for the safe deposit box bank to provide two new keys and change the lock for a customer on every visit.

The electronic version of this idea, however, provides both security and practicality (ease of use).

Consider protected objects 10 such as "Passports", "Identity Cards", and "Credit Cards", such as those shown in FIG. 1. For each protected object 10, the issuer 20 (bank, passport office, etc) will produce two keys 30, 40 (passwords). One will be stored inside the object 10 (on its magnetic strip, for example) and the other stored in the database 50 of the issuer.

For each protected object 10 such as passport, ID card, and credit card, a "Lock" 60 will be designed using data encryption suitable for the security of the object 10 concerned. The encryption lock 60 will serve as an invisible outer layer in addition to any existing protection of the object 10 (such as a PIN number).

In the case of a credit card, for example, inserting it into the card-reading machine will read the two keys 30, 40 into the "Encryption" lock of the issuer. When the two keys 30, 40 are correct, they are recognized by the "Encryption" lock, the credit card is considered as genuine and the lock is opened. This is invisible to the card holder and takes place so quickly that it does not slow down or affect the use of the card.

All the associated other activities such as reading the PIN and money transaction can be performed as usual.

The final and most important step: After the money transaction is completed and before returning the credit card, the card reading machine (i.e. the issuer) produces two new keys and a new lock. One key is stored in the object concerned and other key in the database of the issuer.

Suppose a number of "passports", "ID Cards", and "Credit Cards" are copied with criminal intent. These copied objects will each have the same key 30, 40 as the particular genuine object that was copied or cloned.

When the genuine card or object is now used, the lock and keys inside both the genuine card and database of the issuer will be changed. This will make all illegal copies of the object useless since the old key inside the copied object has no way to match the new key inside the issuer's database. no copy or clone will open the new encryption lock.

In this situation, all unauthorized copies of objects will be disabled automatically. Both the users and the issuer need to do nothing to disable the copies.

Detecting unauthorized copies and/or detecting the usage of illegal copies is a security problem for many organizations such as banks. Suppose a number of "passports", "ID Cards", and "Credit Cards" are copied and used before the genuine object has been used. In this case, the unauthorized copied object will be used successfully.

However, when the genuine object is used after the illegal copy, the genuine object will not get through the encryption lock due to the lock having already been changed. In this case, we know that the genuine object has been copied and there has been an illegal use of a copy. The owner of the genuine object now contacts the issuer and new keys and new lock are then re-installed into the genuine object again to disable all illegal copies of the object.

The detection power of the invention is particularly useful for illegal passport and ID card duplications and eliminates identity frauds of this kind. No matter how many passports and ID cards are duplicated, one and only one can ever be used. All other copies are disabled automatically. When the genuine one is used or recovered from the issuer, all illegal copies will be exposed and can be caught by the issuer.

Proving to a bank that there is an illegal copy of a cash card or credit card has been rather difficult in the past. With the current invention, when the unauthorized copy of a cash card (or credit card) is used, the key in the copied card and the key inside the database of the issuer are both changed.

However, the key inside the genuine card, which is the previous key, will not open the Encryption Lock of the system. This can be used as a proof to the bank that an illegal copy of the card is in circulation. The issuer will be able to verify that the genuine card still has its previous key and therefore has not been used.

TV Set-top boxes and Software such as games, automation software licenses, operating systems, and software applications can all be protected along similar lines.

In order to reduce identity fraud and provide peace of mind, protected objects such as cash cards and credit cards should be used as regularly as possible. In many cases, just checking the balance will do the job, as this will trigger the automatic production of new keys.

Identity theft will be reduced greatly if people check their protected objects daily. A USB on-line card reader can even be developed so that people can check their cards at home on their PC.

To identify the original of an electronic (or electronic transmitted) document such as electronic contract, legal document, etc is difficult in the past.

The invention can also be used to identify the original electronic document by putting a key inside the electronic document and consider the electronic document as a protected object. All the same documents with a different key can be considered as a copy of the original.

The verification process of original electronic document can be done by a program.

The program reads in the key from the document and connects to the Issuer's site on the Internet for example for the second key. When the two keys are available, the electronic document can be verified as original by open the Lock.

In some cases, we can also arrange by encryption that only the original electronic document can be read successfully.

Protecting multiple copies of protected object is not a problem. Suppose we want to protect three cash machine cards (e.g. card1, card2, card3) from the same account. All we need to do is to generate three pairs of keys associated with the three cash machine cards.

For example, the first pair of keys is used to protect card1. One key is stored inside card1 and the other key is stored inside the database of account with reference as card1.

In the situation of this invention is widely used, for example used by operating systems such as Microsoft Windows, Apple Mac, and Internet. Most electronic and digital objects including software, electronic documents, and games can be protected in a global scale. Global discipline for un-authorized copying can be achieved for a certain degree.

Basic Entities of the Invention

Two keys (or one key split into two parts):

One key is stored in the protected object and the other stored in the Issuer's database.

Encryption Lock:

The lock or encryption can be user-defined depending on particular application. It can be one-way encryption (without decryption) or two-way encryption (both encryption and decryption available), or a combination of both.

Verification Process:

The verification process can be considered as opening the encryption lock and can be user-defined depending on the encryption is used. For example, the lock is considered as open when the same encryption results are achieved with the two keys. In some cases, the lock is considered as open when the same decryption results are achieved. Sometimes, a combination of them can be used.

Keys Generator:

A key generator is a mechanism (hardware or software) that can generate two new keys and generate a new lock by encrypting account information every time the keys associated with the encryption are used or selected.

There are a number of ways to implement the invention. For another very simple implementation example, consider the bank card situation.

The two keys and the lock can be generated the following way:

The key generator can generate a time-key or a password and keep changing the password every time to encrypt the following user account information inside the bank database and then store the time-key:

John Smith, 04929 1234 5678, XXBank and the encryption result may be:

01 69 f3 2b 10 88 40 ca 18 22 48 90 1d d4 1a c8 ca d9 df fa d3 68 8c 6f 1b bb fb 51 fc fc 1a e7 43 5e 1d d9 86 fd ca 5a d2 1c bf 6d c7 26 9c 56 78 8b bd af 35 63 bf 92

This encryption results can be split into two parts (i.e. as two keys)

Key1=01 69 f3 2b 10 88 40 ca 18 22 48 90 1d d4 1a c8 ca d9 df fa d3 68 8c 6f 1b

Key2=bb fb 51 fc fc 1a e7 43 5e 1d d9 86 fd ca 5a d2 1c bf 6d c7 26 9c 56 78 8b bd af 35 63 bf 92

Then the Key1 will be stored into the bank card and both the time-key and the Key2 will be stored inside the bank's database.

The validation method for this simple example will be a simple decryption on the joined two keys with the stored time-key to get the user information back and then activate the key generator again to generate new keys and a new time-key. In this case, the first and second keys are acting as the lock. The time-key may be any thing, number or string related to the time or just any random string that is different every time it is generated.

Figure 2:
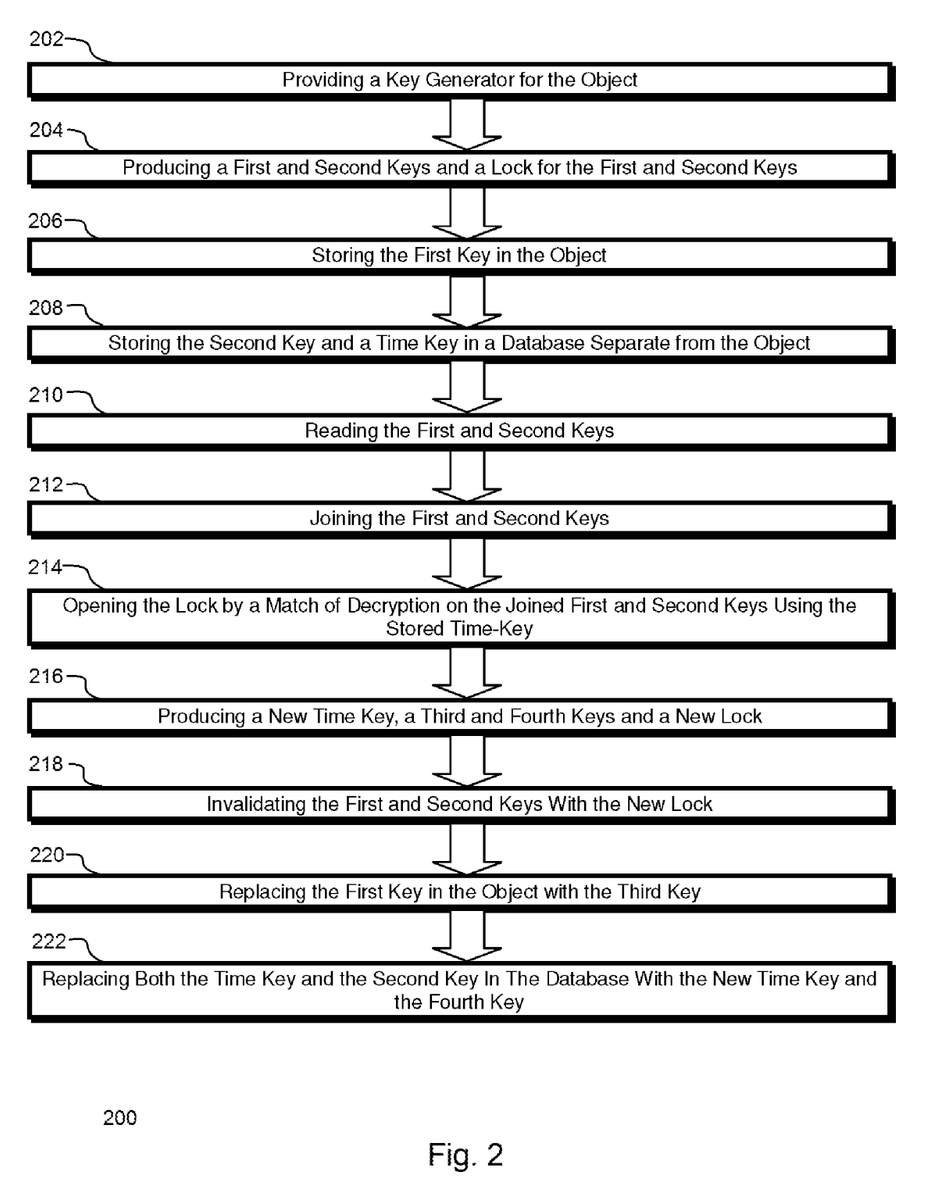
FIG. 2 shows a flowchart of a method for protecting an object from unauthorized copying according to an embodiment.

A flowchart of a method 200 for protecting an object from unauthorized copying according to an embodiment is shown in FIG. 2. The object may be a passport, a bank card, an electronic travel card, a protected electronic document, a smart TV box, a cable TV box, an automobile, an automobile part, a software license, or digital media. The bank card may be a credit card, an ATM card, a debit card, a deposit card, or an electronic payment card. The electronic travel card may be an Oyster card or an Octoplus card. The software license may be a program license, and automation software license, an operating system license, or a mobile phone app. The digital media may be a game, music, a movie, a video clip, television, or an online television series.

In a first operation 202, a key generator is provided for the object. In a second operation 204, a time-key and first and second keys as a lock are produced for the object. The first and second keys may be produced by encrypting account information using the time-key and separating the encrypted account information into the first and second keys. The account information may be account information of a user of the object.

In a third operation 206, the first key is stored in the object. In a fourth operation 208, both the time-key and the second key are stored in a database separate from the object. In a fifth operation 210, the first and second keys are read. In a sixth operation 212, the first and second keys are joined. In a seventh operation 214, the lock is opened by a match of decryption on the joined first and second keys using the stored time-key. In an eighth operation 216, a new time-key, a third and fourth keys are produced forming the new lock. In a ninth operation 218, the first and second keys are invalidated under the new lock. In a 10$^{th}$ operation 220, the first key in the object is replaced with the third key. In a 12$^{th}$ operation 222, both the time-key and the second key in the database are replaced with the new time-key and the fourth key.

Figure 3:
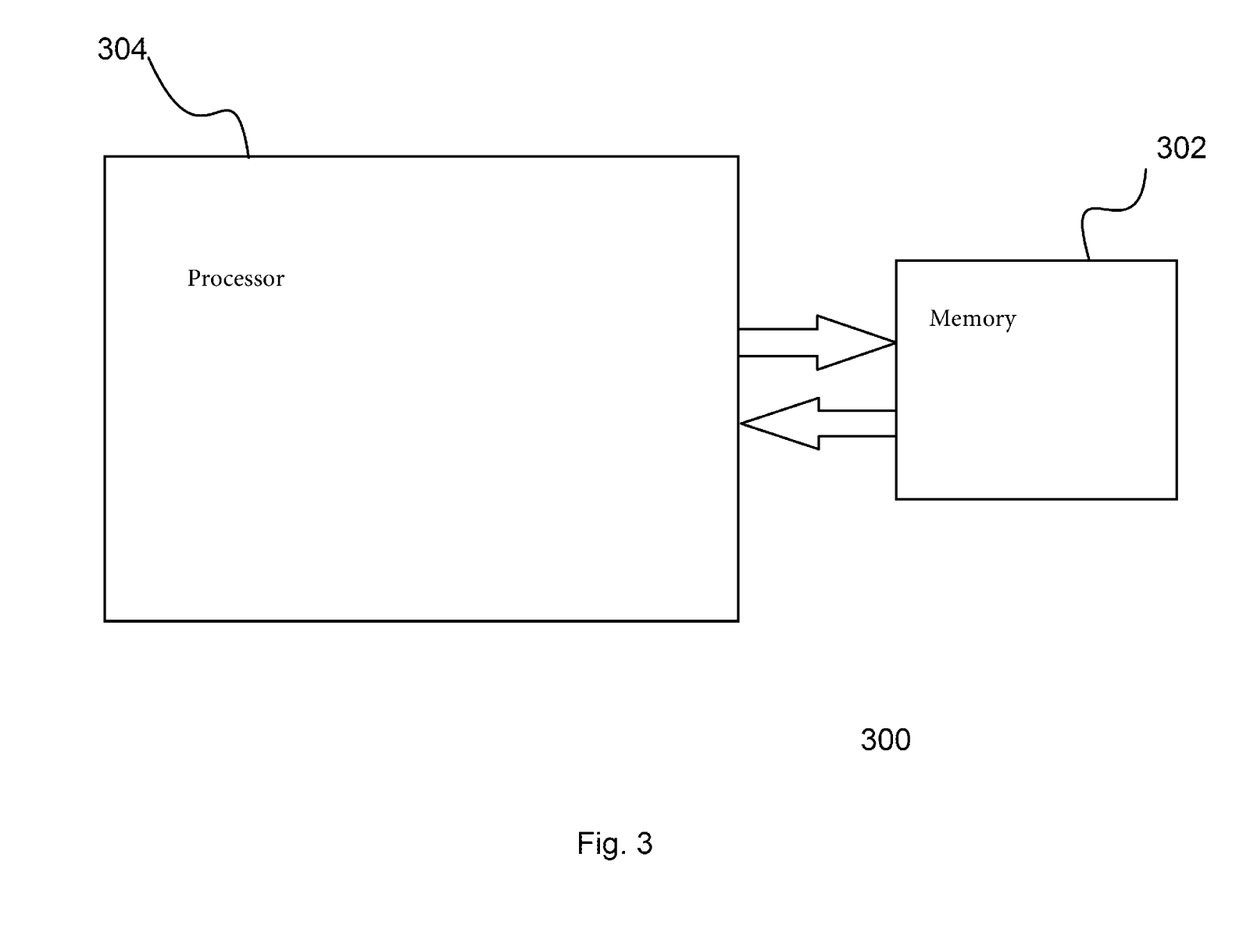
FIG. 3 shows a schematic of a system for protecting an object from unauthorized copying according to an embodiment.

A schematic of a system 300 for protecting an object from unauthorized copying according to an embodiment is shown in FIG. 3. The system includes a memory 302 and a processor 304 coupled to the memory 302. The processor 304 is configured to provide a key generator for the object, produce a first and second keys and a lock using encryption, store the first key in the object, store the second key in a database separate from the object, read the first and second keys, open the lock with the first and second keys, produce a third and fourth keys and a new lock, invalidate the first and second keys with the new lock, replace the first key in the object with the third key; and replace the second key in the database with the fourth key.

Figure 4:
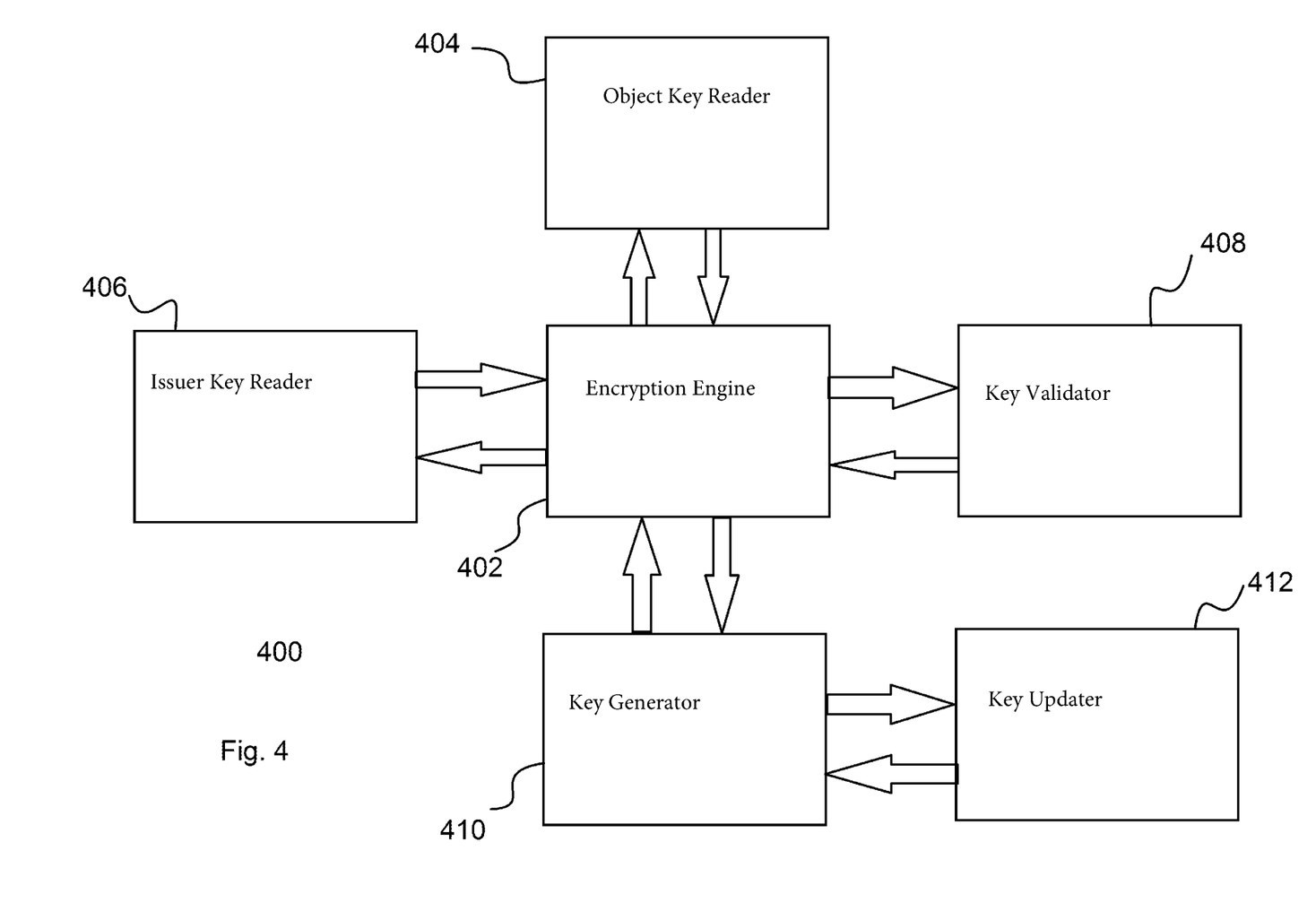
FIG. 4 shows hardware for use with an embodiment.

A schematic of an apparatus 400 for protecting an object from unauthorized copying is shown in FIG. 4. The apparatus 400 includes an encryption engine 402. An object key reader 404 and an issuer key reader 406 are coupled to the encryption engine 402 to read an object key and an issuer key. The encryption engine 402 is configured to read the object key and the issuer key and decrypt them. A key validator 408 is coupled to the encryption engine 402 and configured to encrypt or decrypt the object key and the issuer key to validate the object key and the issuer key.

A key generator 410 is coupled to the encryption engine 402 and configured to generate a time-key and to encrypt user account information to generate an encryption code and split it into the object key and the issuer key. A key updater 412 is coupled to the key generator 410 and configured to update the object key and the issuer key by replacing the object key and the issuer key with a new object key and a new issuer key and a new time-key, respectively, and discard the object key and the issuer key.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The foregoing has described the principles, embodiments, and modes of operation of the present invention. However, the invention should not be construed as being limited to the particular embodiments described above, as they should be regarded as being illustrative and not restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiment.

Obviously, numerous modifications and variations of the present invention are possible in light of the above teachings. It is therefore to be understood that the invention may be practiced otherwise than as specifically described herein.

What is claimed is:

1. A method for protecting an object from unauthorized copying, comprising:
   providing a key generator for the object;
   producing a first key and a second key and a lock for the first key and the second key by encrypting account information with a time related password or time-key, and separating the encrypted account information into the first key and the second key;
   storing the first key in the object;
   storing the second key and the time-key in a database separate from the object;
   reading the first key and the second key;
   joining the first key and the second key;
   opening the lock by a match of decryption of the joined first key and second key using the stored time-key;
   producing a new time key, a third key, a fourth key, and a new lock;
   invalidating the first and the second with the new lock;
   replacing the first key in the object with the third key; and
   replacing both the time-key and the second key in the database with the new time-key and the fourth key.

2. The method of claim 1, wherein the object is selected from the group consisting of:
   a passport,
   a bank card,
   an electronic travel card,
   a protected electronic document,
   a smart TV box,
   a cable TV box,
   an automobile,
   an automobile part,
   a software license, and
   digital media.

3. The method of claim 2, wherein the bank card is selected from the group consisting of:
   a credit card,
   an ATM card,
   a debit card,
   a deposit card, and
   an electronic payment card.

4. The method of claim 2, wherein the electronic travel card is selected from the group consisting of an Oyster card and an Octoplus card.

5. The method of claim 2, wherein the software license is selected from the group consisting of a program license, an automation software license, an operating system license, and a mobile phone app.

6. The method of claim 2, wherein the digital media is selected from the group consisting of:
   a game,
   music,
   a movie,
   a video clip,
   television, and
   an online television series.

7. The method of claim 1, wherein the account information is account information of a user of the object.

8. A system for protecting an object from unauthorized copying, comprising:
- a memory; and
- a processor coupled to the memory and configured to:
  - provide a key generator for the object;
  - produce a first key and a second key and a lock for the first key and the second key by encrypting account information with a time related password or time-key, and separating the encrypted account information into the first key and the second key;
  - store the first key in the object;
  - store the second key and the time-key in a database separate from the object;
  - read the first key and the second key;
  - join the first key and the second key;
  - open the lock by a match of decryption of the joined first key and the second key using the stored time-key;
  - produce a new time key, a third key, a fourth key, and a new lock;
  - invalidate the first key and the second key with the new lock;
  - replace the first key in the object with the third key; and
  - replace both the time-key and the second key in the database with the new time-key and the fourth key.

9. The system of claim 8, wherein the object is selected from the group consisting of:
- a passport,
- a bank card,
- an electronic travel card,
- a protected electronic document,
- a smart TV box,
- a cable TV box,
- an automobile,
- an automobile part,
- a software license, and
- digital media.

10. The system of claim 9, wherein the bank card is selected from the group consisting of:
- a credit card,
- an ATM card,
- a debit card,
- a deposit card, and
- an electronic payment card.

11. The system of claim 9, wherein the electronic travel card is selected from the group consisting of an Oyster card and an Octoplus card.

12. The system of claim 9, wherein the software license is selected from the group consisting of a program license, and automation software license, an operating system license, and a mobile phone app.

13. The system of claim 9, wherein the digital media is selected from the group consisting of:
- a game,
- music,
- a movie,
- a video clip,
- television, and
- an online television series.

14. The method of claim 8, wherein the account information is account information of a user of the object.

15. A non-transitory computer readable medium storing software, which when executed by a system including a processor coupled to a memory, execute a process of protecting an object from unauthorized copying, comprising:
- reading an object key and an issuer key of an issuer associated with the object, respectively,
  - wherein the object key is stored in the object, and the issuer key is stored in a database of the issuer separate from the object;
- encrypting or decrypting the object key and the issuer key to validate the object key and the issuer key;
- generating a time-key and to encrypt or decrypt the object key and the issuer key to generate an encryption code and splitting the encryption code into a new object key and a new issuer key; and
- updating the object key and the issuer key by replacing the object key and the issuer key with the new object key and the new issuer key, respectively, and discarding the object key and the issuer key.

* * * * *

UNITED STATES PATENT AND TRADEMARK OFFICE
CERTIFICATE OF CORRECTION

| | |
|---|---|
| PATENT NO. | : 11,316,686 B2 |
| APPLICATION NO. | : 16/349907 |
| DATED | : April 26, 2022 |
| INVENTOR(S) | : Pak Kay Yuen |

It is certified that error appears in the above-identified patent and that said Letters Patent is hereby corrected as shown below:

In the Claims

Column 10, Line 3:
Claim 14, delete "method" and insert --system--.

Signed and Sealed this
Twenty-eighth Day of June, 2022

Katherine Kelly Vidal
*Director of the United States Patent and Trademark Office*